US012530439B2

United States Patent
Kwok et al.

(10) Patent No.: US 12,530,439 B2
(45) Date of Patent: Jan. 20, 2026

(54) USING BIOMETRIC BEHAVIOR TO PREVENT USERS FROM INAPPROPRIATELY ENTERING SENSITIVE INFORMATION

(71) Applicant: Capital One Services, LLC, McLean, VA (US)

(72) Inventors: Jennifer Kwok, Brooklyn, NY (US); Salik Shah, Washington, DC (US); Mia Rodriguez, Broomfield, CO (US)

(73) Assignee: Capital One Services, LLC, McLean, VA (US)

( * ) Notice: Subject to any disclaimer, the term of this patent is extended or adjusted under 35 U.S.C. 154(b) by 223 days.

(21) Appl. No.: 17/847,418

(22) Filed: Jun. 23, 2022

(65) Prior Publication Data

US 2023/0418915 A1    Dec. 28, 2023

(51) Int. Cl.
| | |
|---|---|
| *G06F 21/32* | (2013.01) |
| *G06F 21/62* | (2013.01) |
| *G06V 10/82* | (2022.01) |
| *G06V 40/20* | (2022.01) |
| *G06V 40/30* | (2022.01) |
| *G06V 40/50* | (2022.01) |
| *G06V 40/70* | (2022.01) |

(52) U.S. Cl.
CPC .......... *G06F 21/32* (2013.01); *G06F 21/6245* (2013.01); *G06V 10/82* (2022.01); *G06V 40/20* (2022.01); *G06V 40/30* (2022.01); *G06V 40/50* (2022.01); *G06V 40/70* (2022.01)

(58) Field of Classification Search
CPC ..... G06F 21/32; G06F 21/6245; G06V 10/82; G06V 40/20; G06V 40/30; G06V 40/50; G06V 40/70
See application file for complete search history.

(56) References Cited

U.S. PATENT DOCUMENTS

| | | |
|---|---|---|
| 8,392,992 B1 | 3/2013 | Spertus |
| 8,799,287 B1 | 8/2014 | Barile et al. |
| 9,177,174 B1 * | 11/2015 | Shoemaker ......... G06F 21/6254 |
| 11,062,098 B1 | 7/2021 | Bergeron et al. |
| 2004/0128552 A1 | 7/2004 | Toomey |
| 2006/0195328 A1 | 8/2006 | Abraham et al. |
| 2015/0281446 A1 | 10/2015 | Milstein et al. |

(Continued)

*Primary Examiner* — Thomas J Dailey
(74) *Attorney, Agent, or Firm* — Bookoff McAndrews, PLLC

(57) ABSTRACT

Disclosed embodiments can pertain to utilizing biometric behavior to prevent inappropriate entry of sensitive information. Current biometric behavior of a user, specific to the user's interaction with an electronic form, can be acquired and compared to benchmark biometric behavior of the user associated with past interaction with the electronic form to create a comparison result. A similarity score based on the comparison result can then be established. It can be inferred that sensitive information was incorrectly entered into the electronic form when the similarity score satisfies a predetermined similarity threshold. The sensitive information can be identified, and a machine learning model can be triggered to generate a risk score based on the similarity score and the identified sensitive information. A user can be prompted to redact incorrectly entered sensitive information when the risk score satisfies a predetermined risk threshold.

19 Claims, 10 Drawing Sheets

(56) References Cited

U.S. PATENT DOCUMENTS

| | | |
|---|---|---|
| 2016/0092581 A1 | 3/2016 | Joshi et al. |
| 2017/0249592 A1* | 8/2017 | Rossi .................... G06F 40/174 |
| 2017/0270310 A1 | 9/2017 | Becker et al. |
| 2019/0026494 A1 | 1/2019 | Smith et al. |
| 2019/0108453 A1* | 4/2019 | Schwabe ................ G06N 20/00 |
| 2019/0171846 A1 | 6/2019 | Conikee et al. |
| 2019/0340466 A1 | 11/2019 | Berseth et al. |
| 2019/0379797 A1 | 12/2019 | Sahagun |
| 2020/0118137 A1 | 4/2020 | Sood et al. |
| 2020/0233550 A1 | 7/2020 | Kalathur et al. |
| 2020/0257576 A1 | 8/2020 | Gallagher et al. |
| 2020/0380119 A1 | 12/2020 | Correa Bahnsen et al. |
| 2021/0097178 A1* | 4/2021 | Bottaro ............. G06F 16/24575 |
| 2021/0125615 A1 | 4/2021 | Medalion et al. |
| 2021/0334407 A1 | 10/2021 | North et al. |
| 2022/0121772 A1* | 4/2022 | Singh .................. H04L 65/4015 |
| 2023/0351045 A1* | 11/2023 | Semegn .............. G06F 21/6254 |

\* cited by examiner

USING BIOMETRIC BEHAVIOR TO PREVENT USERS FROM INAPPROPRIATELY ENTERING SENSITIVE INFORMATION

BACKGROUND

Customer service representatives/agents and customers (e.g., users) can accidentally enter sensitive information such as personally identifiable information (PII) into wrong form fields or other locations in electronic documents. For example, customers and agents have been found prone to enter social security numbers (SSNs) and credit card numbers into incorrect portions including the note fields of electronic documents. Customers have also accidentally filled their user names with their SSN or credit card number. Customers also incorrectly enter sensitive information such as PII in a number of other unconventional ways. When entered incorrectly, this unmasked sensitive information can be transmitted without proper encryption and may not be properly encrypted and stored. This may violate federal and international regulations requiring sensitive information and PII to be properly transmitted and stored with adequate safety measures. When an organization violates one or more regulations, that organization may suffer from a damaged reputation. If the public knows an organization violates regulations regarding proper handling of sensitive information and PII, that organization may lose public trust and eventually lose economically from the loss of business from a reduced customer base.

SUMMARY

The following presents a simplified summary to provide a basic understanding of some aspects of the disclosed subject matter. This summary is not an extensive overview. It is not intended to identify key/critical elements or delineate the scope of the claimed subject matter. Its sole purpose is to present some concepts in a simplified form as a prelude to the more detailed description presented later.

Briefly described, embodiments of the subject disclosure can include a method for monitoring the input of sensitive information (e.g., sensitive data). The method captures a current biometric behavior of a user that is specific to the user's interaction with an electronic form. The current biometric behavior is compared to a benchmark biometric behavior of the user associated with past interaction with the electronic form to create a comparison result. A similarity score based on the comparison result is then established. The method infers that sensitive information was incorrectly entered into the electronic form when the similarity score satisfies a predetermined similarity threshold. The sensitive information is identified, and a machine learning model is triggered to generate a risk score based on the similarity score and the identified sensitive information. The method prompts the user to redact the incorrectly entered sensitive information when the risk score satisfies a predetermined risk threshold.

In some instances, the method further includes inferring that sensitive information was incorrectly entered into the electronic form using natural language processing and the similarity score. In other instances, the sensitive information is compared to a known syntax of the sensitive information. The method can prevent the user from moving to the next screen until the sensitive information is entered correctly. In some configurations, the current biometric behavior represents a period of time the user takes to complete sections of the electronic form.

In another instance, the method detects if the sensitive information is entered incorrectly and if the detecting exceeds an acceptable risk score. Responsive to detecting exceeding the acceptable risk score, the user is prompted on how to enter the sensitive information correctly. The user can be prompted how to enter sensitive information in various ways. For example, the method can use a chatbot to prompt the user on how to enter the sensitive information correctly. Alternatively, the method can use a text window to prompt the user on how to enter the sensitive information correctly. A light indicator can be created responsive to the risk score. An audible indicator can be created responsive to the risk score.

According to another aspect, embodiments can include a system for monitoring the correct entering of sensitive information. An input logic captures a current biometric behavior of a user that is specific to the user's interaction with an electronic form. Comparison logic compares the current biometric behavior to a benchmark biometric behavior of the user associated with past interaction with the electronic form to create a comparison result and to establish a similarity score based on the comparison result. Identification logic is used to identify sensitive information in response to inferring that sensitive information was incorrectly entered into the electronic form when the similarity score satisfies a predetermined similarity threshold. Machine learning logic generates a risk score based on the similarity score and the identified sensitive information. The system uses remediation logic to prompt the user to redact the incorrectly entered sensitive information when the risk score satisfies a predetermined risk threshold.

In other instances, machine learning logic is trained using the current biometric behavior and the benchmark biometric behavior. In other aspects, the machine learning logic includes a convolutional neural network (CNN) to establish the similarity score. The CNN is trained using the benchmark biometric behavior.

In other configurations, the remediation logic includes other features. For example, the remediation logic can display information on an electronic device explaining how to enter the sensitive information. The remediation logic can display a chatbot on the electronic device to let the user chat about how to enter sensitive information. The remediation can also create an audible signal that describes to the user how to enter the sensitive information. The remediation logic can further prompt the user on how to enter sensitive information with a text window.

According to another aspect, embodiments can include a method executing, on an electronic device processor, instructions that cause the electronic device processor to perform operations for detecting incorrectly entered sensitive information. One operation executed includes capturing a current biometric behavior of a user that is specific to the user's interaction with an electronic form. The current biometric behavior is compared to a benchmark biometric behavior of the user associated with past interaction with the electronic form to create a comparison result. Another instruction executed establishes a similarity score based on the comparison result. An inference is made that sensitive information was incorrectly entered into the electronic form when the similarity score satisfies a predetermined similarity threshold. The sensitive information is identified, and a machine learning model is triggered to generate a risk score based on the similarity score and the identified sensitive information. The user is prompted to redact the incorrectly entered sensitive information when the risk score satisfies a predetermined risk threshold.

In other instances, the method collects biometric user information, including timing information related to how rapidly the user enters sensitive information. In another instance, the method collects biometric user information associated with entering sensitive information at a website.

To the accomplishment of the foregoing and related ends, certain illustrative aspects of the claimed subject matter are described herein in connection with the following description and the annexed drawings. These aspects indicate various ways in which the subject matter can be practiced, all of which are intended to be within the scope of the disclosed subject matter. Other advantages and novel features may become apparent from the following detailed description when considered in conjunction with the drawings.

BRIEF DESCRIPTION OF THE DRAWINGS

The accompanying drawings, which are incorporated in and constitute a part of the specification, illustrate various example methods and configurations of various aspects of the claimed subject matter. It will be appreciated that the illustrated element boundaries (e.g., boxes, groups of boxes, or other shapes) in the figures represent one example of the boundaries. It is appreciated that in some examples, one element can be designed as multiple elements or that multiple elements can be designed as one element. In some examples, an element shown as an internal component of another element can be implemented as an external component and vice versa. Furthermore, elements may not be drawn to scale.

DETAILED DESCRIPTION

Figure 1:
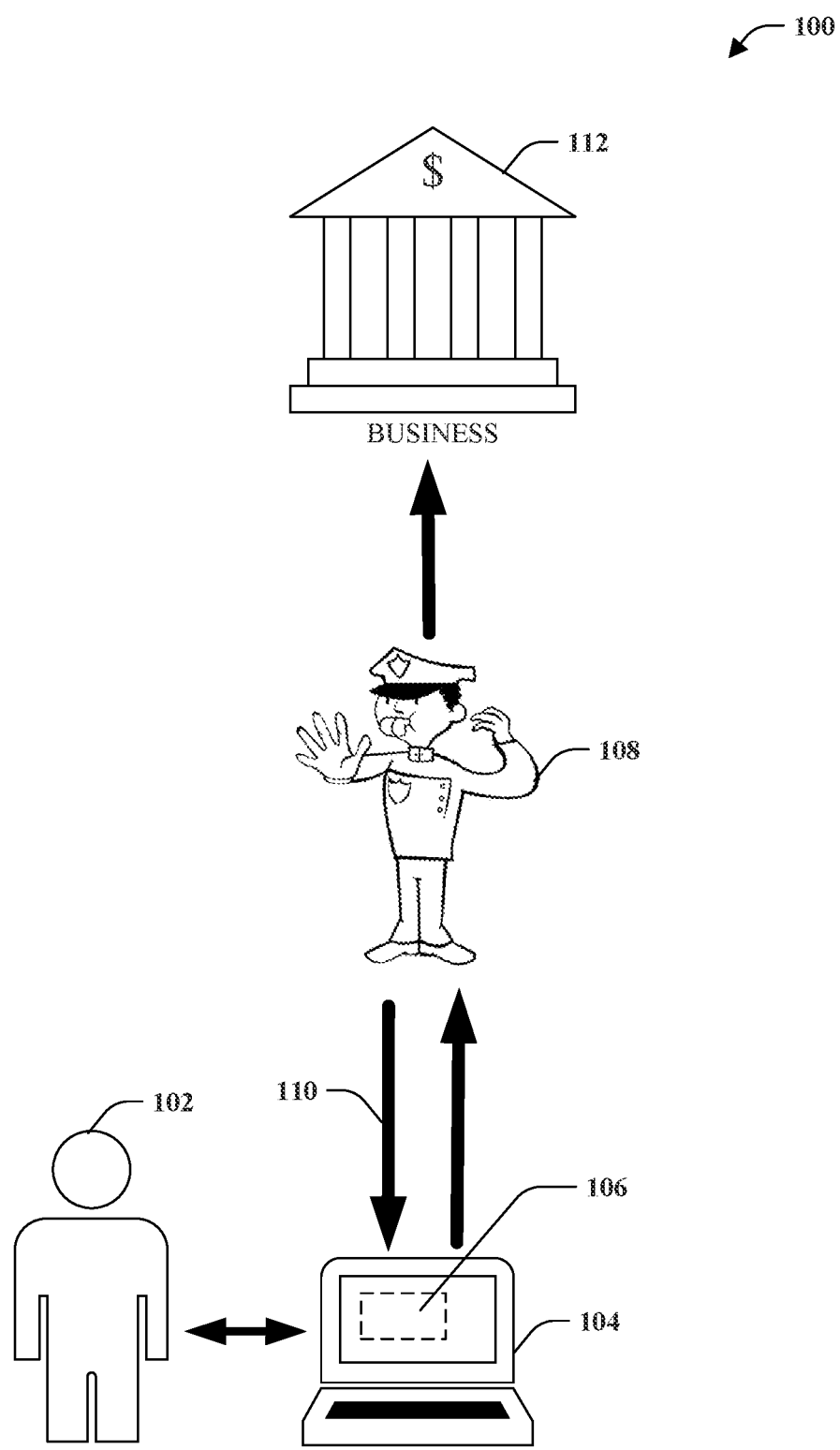
FIG. 1 illustrates an overview of an example implementation.

The subject disclosure and related embodiments generally pertain to behavioral biometrics. Behavioral biometrics corresponds to how a user behaviorally interacts with a computer system. For example, a user's interaction with a computer system can be tracked. The tracking of user interaction can include behavioral data of how fast a user fills out blocks within a standard form, a frequency the user creates typos or other mistakes, how often the user hesitates or pauses within a block of a form, and the like. This behavior biometric data creates a unique behavioral profile of each end-user. This behavioral data can be used to predict which users with a specific behavioral profile are more or less likely to input sensitive information inappropriately.

The concept of using behavioral biometrics to predict the likelihood of and prevent inappropriately/incorrectly inputting sensitive information into standard documents can prevent the nonintentional release of personally identifiable information (PII). Behavioral biometrics analyzes a user's digital, physical, and cognitive behavior and is commonly used as a fraud prevention solution. Some of the same concepts of behavior biometrics can be used to prevent the unauthorized release of PII or other sensitive information by customers, customer agents, or other personnel when entering data into a system, such as a business system, banking system, or another system as understood by those of ordinary skill in the art.

Details disclosed herein generally pertain to a way of preventing sensitive information from being incorrectly/inappropriately entered and stored into a computer system. A method includes detecting a biometric behavior. The biometric behavior can be determined on an electronic device or in software while entering data into a form associated with the software. A determination is made as to whether biometric behavior is associated with entering sensitive information. When the biometric behavior is associated with entering sensitive information, a determination is made if the sensitive information is entered or being entered incorrectly. If the sensitive information is entered incorrectly, the method prompts the user for the sensitive information to be entered correctly.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

"Processor" and "Logic," as used herein, includes but are not limited to hardware, firmware, software, or combinations of each to perform a function(s) or an action(s), or to cause a function or action from another logic, method, or system to be performed. For example, based on a desired application or need, the logic or the processor can include a software-controlled microprocessor, discrete logic, an application-specific integrated circuit (ASIC), a programmed logic device, a memory device containing instructions, or the like. The logic or the processor can include one or more physical gates, combinations of gates, or other circuit components. The logic or the processor can also be fully embodied as software. Where multiple logics or processors are described, it may be possible to incorporate the multiple logics or processors into one physical logic (or processor). Similarly, where a single logic or processor is described, it may be possible to distribute that single logic or processor between multiple physical logics or processors.

Referring initially to FIG. 1, a high-level overview of an example implementation of a system 100 for preventing sensitive information from inappropriately or incorrectly entering an electronic file is illustrated. Preferably the sensitive information is prevented from inappropriately or incorrectly being saved into the file at the time of file creation or updating. It is easier to preemptively prevent the inappropriate/incorrect use of sensitive information rather than trying to correct the inappropriate/incorrect user later.

This example implementation includes a user 102 entering information into a computer 104. The user 102 can enter sensitive information related to an online purchase, another business transaction, a banking transaction, and the like. The computer 104 can be a laptop, tablet computer, mobile phone, or another electronic device. The user 102 can enter sensitive information 106, such as personally identifiable information (PII), into a form on the computer 104. The sensitive information 106 can be entered through a webpage, special form, and the like that can be provided by a business 112, school, bank, church, or other organization. As sensitive information 106 is being entered, or when it is transmitted to the business 112, a gateway 108 (represented by the police person) checks to make sure the sensitive information 106 is entered in the correct location so that it will be properly obfuscated or otherwise properly handled as sensitive information. As discussed below, in some instances, the gateway 108 can be in the form of a machine learning model. If the sensitive information 106 is improperly entered, the gateway 108, via return path 110 to the computer 104, will instruct or prompt the user 102 on how to properly re-enter the sensitive information 106. In another configuration, the gateway 108 can be located in the business 112, or, alternatively, the gateway 108 can be located in the computer 104. Catching incorrectly entered sensitive information in this way and having the sensitive information re-entered properly before the business accepts it avoids violating national and international regulations protecting the safe handling of sensitive information.

Figure 2:
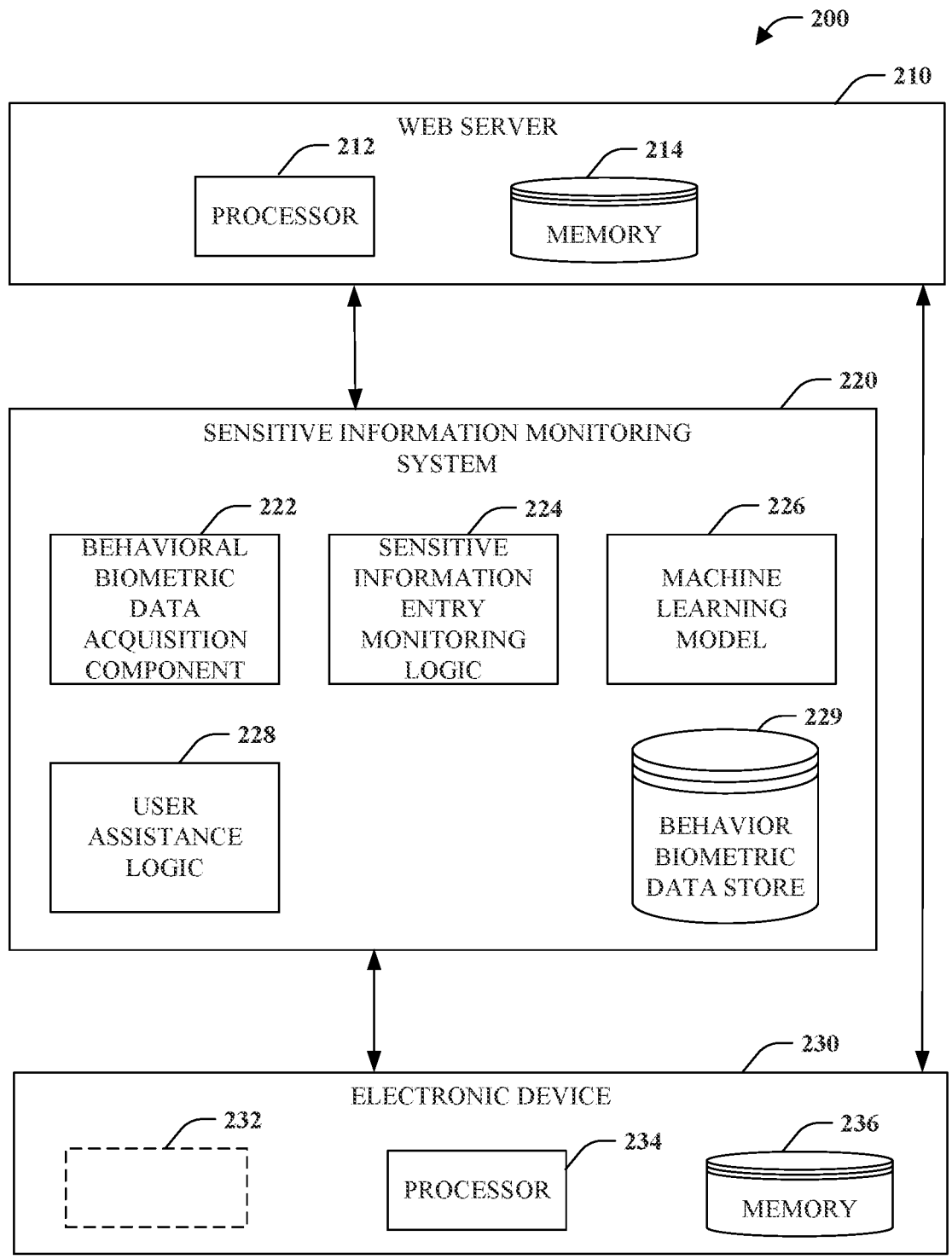
FIG. 2 is a block diagram of a sensitive information monitoring system.

Turning attention to FIG. 2, an example sensitive information monitoring system 200 for protecting sensitive information 232 is illustrated in further detail. The sensitive information 232 can include a social security number (SSN), date of birth, Centers for Medicare and Medicate Services (CMS) certification number (CCN), as well as other private identifying information (PII) of an individual. The sensitive information 232 can also include confidential, secret, top-secret information; bank account numbers, SSNs, CCNs, driver's license numbers, passport numbers, various different types of text IDs, including different versions of SSN IDs in other countries; PII and sometimes non-personally identifiable information (NPI); and the like. Customers/users and customer agents assisting customers regularly type or copy the sensitive information 232 into the wrong place without knowing that they are incorrectly typing or copying the sensitive information 232 into an incorrect location. By way of example, agents can be required to take notes when assisting some customers, and some agents add too much material on freeform notes and some of that material can be sensitive information. The example system of FIG. 2 attempts to remedy the incorrect placement or copying of sensitive information before the electronic document containing the sensitive information 232 is created or stored. Preventing the violation of national or international regulations guarding the proper handling of the sensitive information 232 can prevent violations and protect an organization's reputation.

User-specific biological behavior can be used to create unique behavioral profiles of end-users based on their typical online behavior when inputting information when interacting with a business computer system, a banking computer system, a secured computer system, or another computer system that can handle sensitive information. This behavior information can be used to coach end users on what they should or should not input into a specific field. In some cases, tooltips or a more interactive chatbot or overlay is triggered to interact with users or show reminders of how to correctly enter personally identifiable information or non-personally identifiable information PII/NPI, and the like to be sure the users correctly enter sensitive information.

The example sensitive information monitoring system 200 includes a web server 210, a sensitive information monitoring system 220, and an electronic device 230. In one example configuration, a web server displays a merchant-provided webpage. The webpage includes products or services offered for sale by the merchant and includes functionality to support electronic purchases of the products or services. For example, a customer can interact with the webpage to add items to an electronic shopping cart. To complete the purchase, the customer enters credit card information or other sensitive information that is sent back through the sensitive information monitoring system 220 for further processing.

In one example configuration, the web server 210 and the electronic device 230 include a web server processor 212 and an electronic device processor 234 and memories 214 and 236, respectively. The web server processor 212 and the electronic device processor 234 can be implemented with solid-state devices such as transistors to create processors that implement functions that one of ordinary skill in the art will appreciate are executed in silicon or other materials. Furthermore, the web server processor 212 and the electronic device processor 234 can be implemented with general-purpose processors, digital signal processors (DSPs), application-specific integrated circuits (ASICs), field-programmable gate arrays (FPGAs), or other programmable logic devices, discrete gates or transistor logic, discrete hardware components, or any combination thereof designed to perform the functions described herein. A general-purpose processor can be a microprocessor, but in the alternative, the processor can be any processor, controller, microcontroller, or state machine. The web server processor 212 and the electronic device processor 234 can also be implemented as a combination of computing devices, for example, a combination of a DSP and a microprocessor, a plurality of microprocessors, multi-core processors, one or more microprocessors in conjunction with a DSP core, or any other such configuration as understood by those of ordinary skill in the art.

The storage devices or memories 214 and 236 can be any suitable devices capable of storing and permitting data retrieval. In one aspect, the storage devices or memories 214 and 236 can store data representing an original website or multiple related websites. Storage media includes volatile and non-volatile, removable and non-removable media implemented in any method or technology for information storage. Storage media includes, but is not limited to, storage devices such as memory devices (e.g., random access memory (RAM), read-only memory (ROM), magnetic storage devices (e.g., hard disk, floppy disk, cassettes, tape . . . ), optical disks and other suitable storage devices.

The sensitive information monitoring system 220 includes a behavioral biometric data acquisition component 222, a sensitive information entry monitoring logic 224, a machine learning model 226, a user assistance logic 228, and a behavioral biometric data store 229. The behavioral biometric data acquisition component 222, the sensitive information entry monitoring logic 224, the machine learning model 226, and the user assistance logic 228 can be implemented by a processor coupled to a memory that stores instructions that, when executed, cause the processor to perform the functionality of each component. Further, the behavioral biometric data store 229 can correspond to a persistent data structure (e.g., table) accessible by the machine learning model 226. As such, a computing device is configured to be a special-purpose device or appliance that implements the functionality of the sensitive information monitoring system 220. The behavioral biometric data acquisition component 222, the sensitive information entry monitoring logic 224, the machine learning model 226, and the user assistance logic 228 can be implemented in silicon or other hardware components so that the hardware or software can implement their functionality as described herein.

The behavioral biometric data acquisition component 222 is operable to receive, retrieve, or otherwise obtain or acquire data associated with a user's biometric behavior or actions. The data can include, for example, data detecting that a user is filling out a form field extremely quickly, and this can be behavioral biometric data indicating that there is a good chance that a user can enter sensitive information in an incorrect location. Alternatively, a user can be going through or filling out a form too slowly or hesitating and with lots of pauses, or indicate that the user is having trouble filling out an electronic form. The machine learning model 226 and the user assistance logic 228 can use this information to preemptively correct for misplaced sensitive information 232. This information can be used by the machine learning model 226 to determine how likely a user or agent is to make a mistake and input sensitive information in an incorrect location within a document. The user assistance logic 228 can use information from the machine learning model 226 to assist the user in correctly entering sensitive information.

The user assistance logic 228 can use data and information from the behavioral biometric data acquisition component 222, the sensitive information monitoring logic, and the machine learning model 226 to correct user behavior that might lead to the loss of sensitive information. For example, the user assistance logic 228 can use the information/behavior biometrics to display "tooltips" or some other useful mechanism for the remediation of incorrectly/inappropriately entered sensitive information. Instead of placing a tooltip on every single field, the sensitive information monitoring system 220 can just show a tooltip or other useful information where the mistake is likely to happen. The user assistance logic 228 can detect if a customer is struggling through a form or taking an abnormal amount of time to fill out a form that will contain sensitive information. When this is detected by the behavior biometric data acquisition component 222 or the sensitive information entry monitoring logic 224, the user assistance logic 228 can display an interactive chatbot or some other interactive device a user can chat with or ask questions with or otherwise have and interactive conversation with.

In another aspect, the sensitive information entry monitoring logic 224 and machine learning model 226 can determine sensitive information 232 is being entered in an incorrect location or should not be entered at all. Upon this detection, the user assistance logic 228 can flash indications or lights on the electronic device 230 or cause the electronic device 230 to make noise or audible signals. If the sensitive information entry monitoring logic 224 and machine learning model 226 detect and determine that the user has committed a serious error in the entry of sensitive information 232, the user assistance logic 228 can prevent the user of the electronic device 230 from going to the next page of the electronic form until remediation is performed. For example, the user assistance logic 228 can highlight a field within the form itself where the sensitive information 232 should be entered. Alternatively, or in addition, the user assistance logic 228 can display a message above, or below, or beside the field wherein the sensitive information 232 should be entered. The information will provide the user information on how to enter the sensitive information 232 properly. In some instances, the user assistance logic 228 can gray out a "next" button and not allow the user to proceed with the next page until the error is corrected.

In other instances, information can not be biological behavior information but is information related to a person's actions while using the electronic device 230. This information can still be detected by the behavioral biometric data acquisition component 222. For example, the behavioral biometric data acquisition component 222 can detect an abnormally long pause when the user is working on a form while entering the sensitive information 232, and this can be useful information for the sensitive information entry monitoring logic 224 and the machine learning model 226 to know when determining if the sensitive information 232 can have been entered incorrectly or is likely to be entered incorrectly. Of course, the sensitive information monitoring system 220 may not know what caused the long pause; however, long pauses are a known reason that sensitive information may be incorrectly entered into a form, webpage, and the like. Thus, a long pause can be heavily weighted by the machine learning model 226.

The sensitive information entry monitoring logic 224 can detect that the user may take a long pause caused by the user receiving a phone call, someone walks up to the user's cubical or office and starts talking with the user, or the user leaves to get a cup of coffee, or another reason. The sensitive information entry monitoring logic 224 can detect long pauses that may also be created when a mobile phone user receives a text message that distracts the user. Long pauses can also be created when a user switches away from a form to possibly work on another form and then returns to the original form/screen later. The sensitive information entry monitoring logic 224 can detect the user interfaced with their text message/opened a text message application which can lead to a long pause. Additionally, the time of day may be more prone to cause a user to incorrectly/inappropriately enter sensitive data. Is the time of day before the user's lunchtime? Right after lunchtime? What day of the week is it? What type of weather may be occurring? Or what is the weather forecast the user may be aware of? All of these times or conditions can affect the accuracy of entering sensitive information. A person may have more errors on a Monday or if it is late on a Friday. The first form an agent works on in the morning may be prone to sensitive information errors, as is the 400th form in a day. The day before a holiday and seasonality also may cause sensitive information to be entered incorrectly or less incorrectly depending on aspects of the timing and the individual.

In other aspects, the sensitive information entry monitoring logic 224 can monitor background noise and devices such as Amazon's Alexa. The sensitive information entry monitoring logic 224 can monitor an agent interfacing with a user. For example, the sensitive information entry monitoring logic 224 can detect if the agent sounds tired, angry, or has another mood. The sensitive information entry monitoring logic 224 can monitor the agent's voice frequency, voice fluctuations, and other attributes. All of the above factors can be taken into account by the machine learning model 226 when determining if sensitive data has or may be improperly entered.

In one configuration, the sensitive information monitoring system 220 includes behavioral biometric data acquisition component 222 to collect behavior biometric information about how a user interacts with the electronic device 230. The sensitive information entry monitoring logic 224 performs natural language processing associated with the sensitive information. The machine learning model 226 determines if sensitive information may not be entered correctly based on the behavior biometric information and the natural language processing. The user assistance logic 228 prompts the user on how to enter the sensitive information when the machine learning model 226 determines that the sensitive information 232 may not be entered correctly. For example, the user assistance logic 228 can display information on the electronic device 230 when the sensitive information 232 may not be entered correctly, explaining how to enter the sensitive information 232. The user assistance logic 228 can display a chatbot on the electronic device to permit chat as to how to enter the sensitive information.

The machine learning model 226 is operable to analyze the input of sensitive information 232, compute a risk score, and determine if the risk score crosses a threshold level (e.g., exceeds a threshold level). The risk score is a value that indicates the likelihood that an item on a form, website, or the like, was sensitive information that was entered incorrectly. In other words, the risk score is a value that captures the probability that the sensitive information 232 was entered incorrectly. For example, the machine learning model 226 can employ one or more rules to compute the risk score.

Various portions of the disclosed systems above and methods below can include or employ artificial intelligence or knowledge or rule-based components, sub-components, processes, means, methodologies, or mechanisms (e.g., support vector machines, neural networks, expert systems, Bayesian belief networks, fuzzy logic, data fusion engines, classifiers). Such components, among others, can automate certain mechanisms or processes performed, thereby making portions of the systems and methods more adaptive as well as efficient and intelligent. By way of example, and not limitation, the sensitive information monitoring system 220 of FIG. 2 can employ such mechanisms to automatically determine a risk score that is associated with the risk of sensitive information being placed in the wrong location or that the sensitive information should have been entered into a form or webpage at all.

Figure 3:
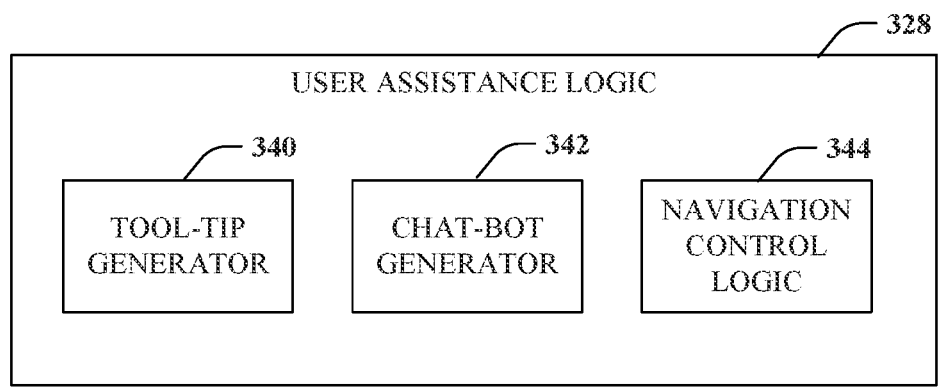
FIG. 3 is a block diagram of an example user assistance logic.

The user assistance logic 228 of FIG. 2 is now described in more detail with reference to FIG. 3. The user assistance logic 328 of FIG. 3 includes a tooltip generator 340, a chatbot generator 342, and a navigation control logic 344. The tooltip generator is configured to create textual content to be displayed to a user of an electronic device to provide the user textual guidance on entering sensitive information. The tooltip generator 340 can provide textual guidance near where the sensitive information is input on a form, webpage, and the like. The chatbot generator 342 can generate a chatbot for interacting with a user with guidance concerning how to enter or correct incorrectly entered sensitive information when a machine learning logic determines that sensitive may have been incorrectly entered at an electronic device.

The navigation control logic 344 can control how information is entered in a form, webpage, or the like. For example, if a machine learning model determines that sensitive information may have been incorrectly entered into a form, the navigation control logic 344 may not allow a user to enter any more data or information until the incorrectly entered sensitive information is remedied. In other aspects, the navigation control logic 344 can lock the page by graying out the "next page" button and not allowing the user to proceed to the next page until the sensitive information is entered correctly.

Figure 4:
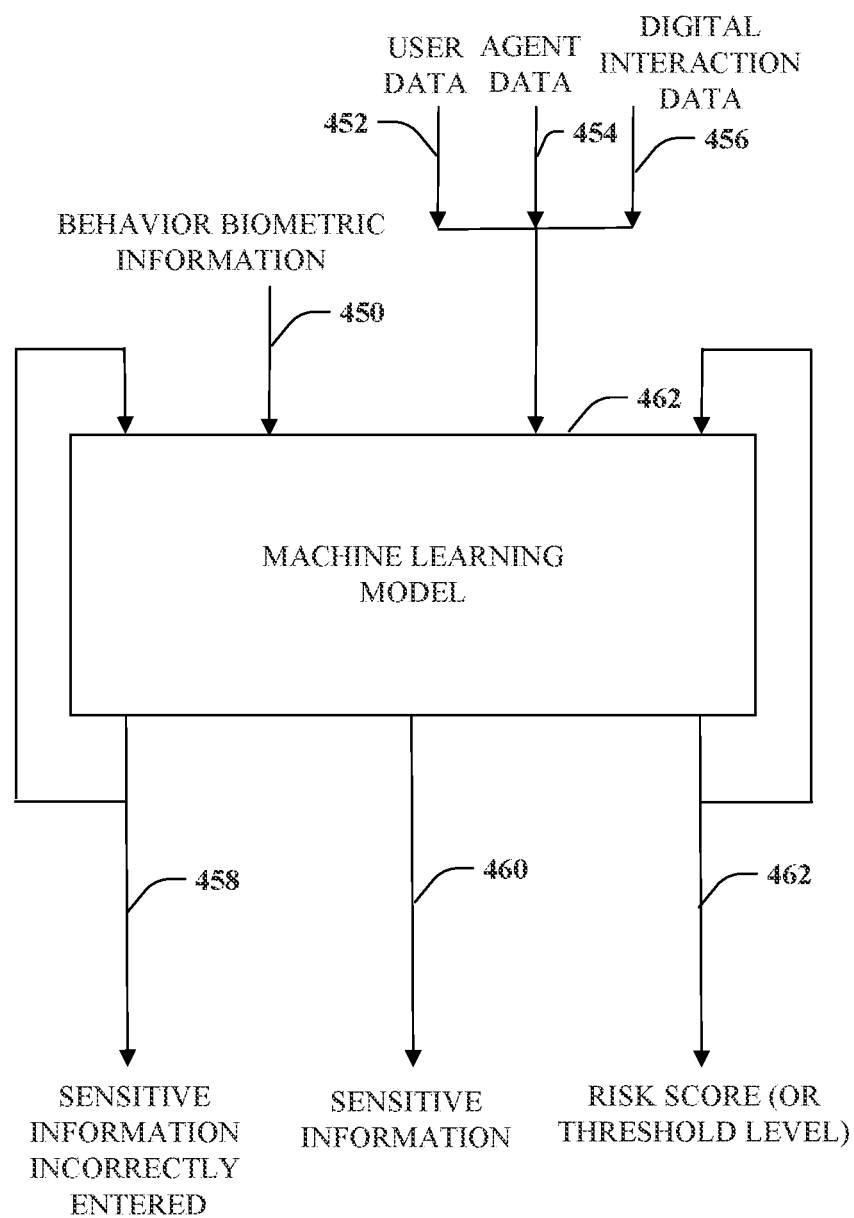
FIG. 4 is a block diagram of an example machine learning model.

FIG. 4 depicts the machine learning model 426 in accordance with an example particular embodiment. The machine learning model 426 is used to prevent end computer system users from accidentally incorrectly inputting and submitting sensitive information. This helps prevent users from entering sensitive information at the source and eliminates the requirement of cleaning up incorrectly entered sensitive information after the sensitive information has already been committed to a form, stored in memory, or the like.

Behavior biometrics 450 are a primary input to the machine learning model 426. Instead of looking at a person's profile, behavior biometrics captures a profile of the person's behavior profile.

Non-behavioral biometrics data can also be captured. Information that captures a person's profile (not their behavior profile) can include three types of data. This data includes user information 452 (or customer information), agent information 454, and digital interaction data 456. The machine learning model 426 is trained on the behavior biometrics 450, user information 452, agent information 454, and the digital interaction data 456 for predicting a likelihood of end users inappropriately inputting sensitive information into a computer system. The machine learning model 426 outputs a signal of whether sensitive information is not entered correctly or inappropriately (sensitive information incorrectly entered 458). The machine learning model 426 also outputs the sensitive information 460 that may have been incorrectly entered. The machine learning model 426 also outputs a risk score that indicates how confident the machine learning model 462 is that the determination is correct. Based on the risk score, the machine learning model 426 can display textual or "tooltips" that can be displayed near where the sensitive information was incorrectly input to prompt the user on how to enter the sensitive information correctly. In another example, a chatbot can be presented to interact with the user to prevent the inappropriate entering of personally identifiable information.

Figure 5:
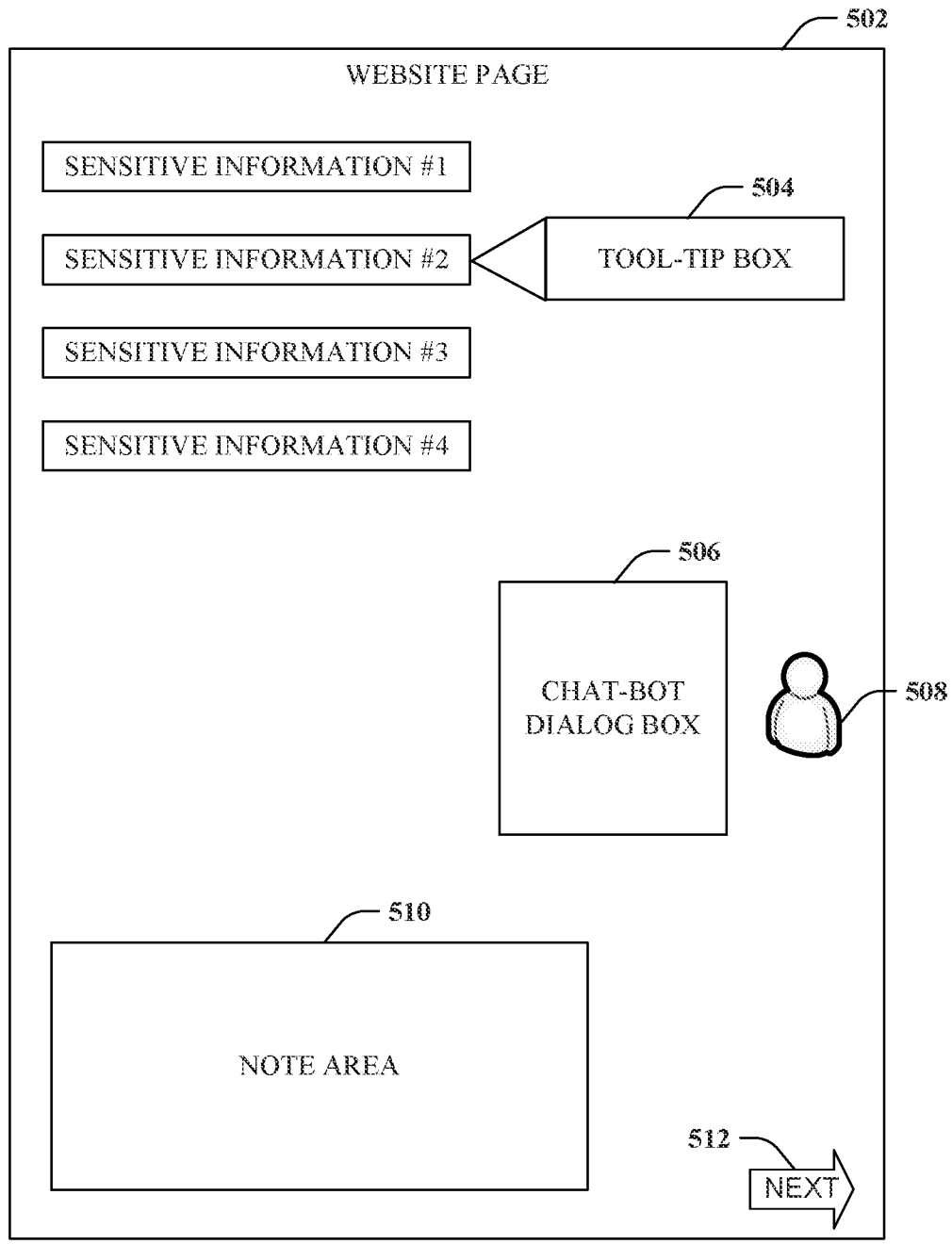
FIG. 5 is an example website page for entering sensitive information.

FIG. 5 illustrates one example of a website page 502 where a user may enter sensitive information. The website page 502 is one example way a user can enter sensitive information. Other ways include electronic documents, software windows, and other ways as understood by those of ordinary skill in the art. The user may be entering sensitive information into one or more sensitive information fields #1-4. Of course, other website pages can have more or fewer sensitive information fields. In aspects of the configurations disclosed here, the user may input incorrect information in sensitive information field #2, for example.

When the systems and methods described herein detect the entering of the incorrect sensitive information into sensitive information field #2, a tooltip window 504 can be displayed on the website page 502 near sensitive information field #2 that can instruct the user what information to enter into sensitive information field #2. In some instances, when incorrect sensitive information is detected in this field, sensitive information fields #3 and 4 can be locked until the user has remedied the sensitive information that was entered into sensitive information field #2 or how to enter that information. Sometimes, the method or system can gray out a next button 512 and not proceed with the next field until the sensitive information error is corrected. If the systems and methods described above and below detect that the user is still having difficulty entering the correct sensitive information into sensitive information field #2, then a chatbot text window 506 and icon 508 can be displayed to allow the user to ask for more specific advice tailored to that user about how to remedy the input of incorrect sensitive information.

In other instances, the website page 502 can further include a note area 510. The note area is where a customer representative can place notes concerning a user they are assisting. In general, sensitive information should not be placed in this note area 510. Thus, the methods and systems can monitor this note area 510 and display appropriate messaging to the customer agent when inappropriate sensitive information is detected in this area. Of course, lighting alerts, coloring alerts, audio alerts, and the like may be used to alert a user of the website page 502 when sensitive information is inappropriately placed on or in the wrong location on the website page 502.

Figure 6:
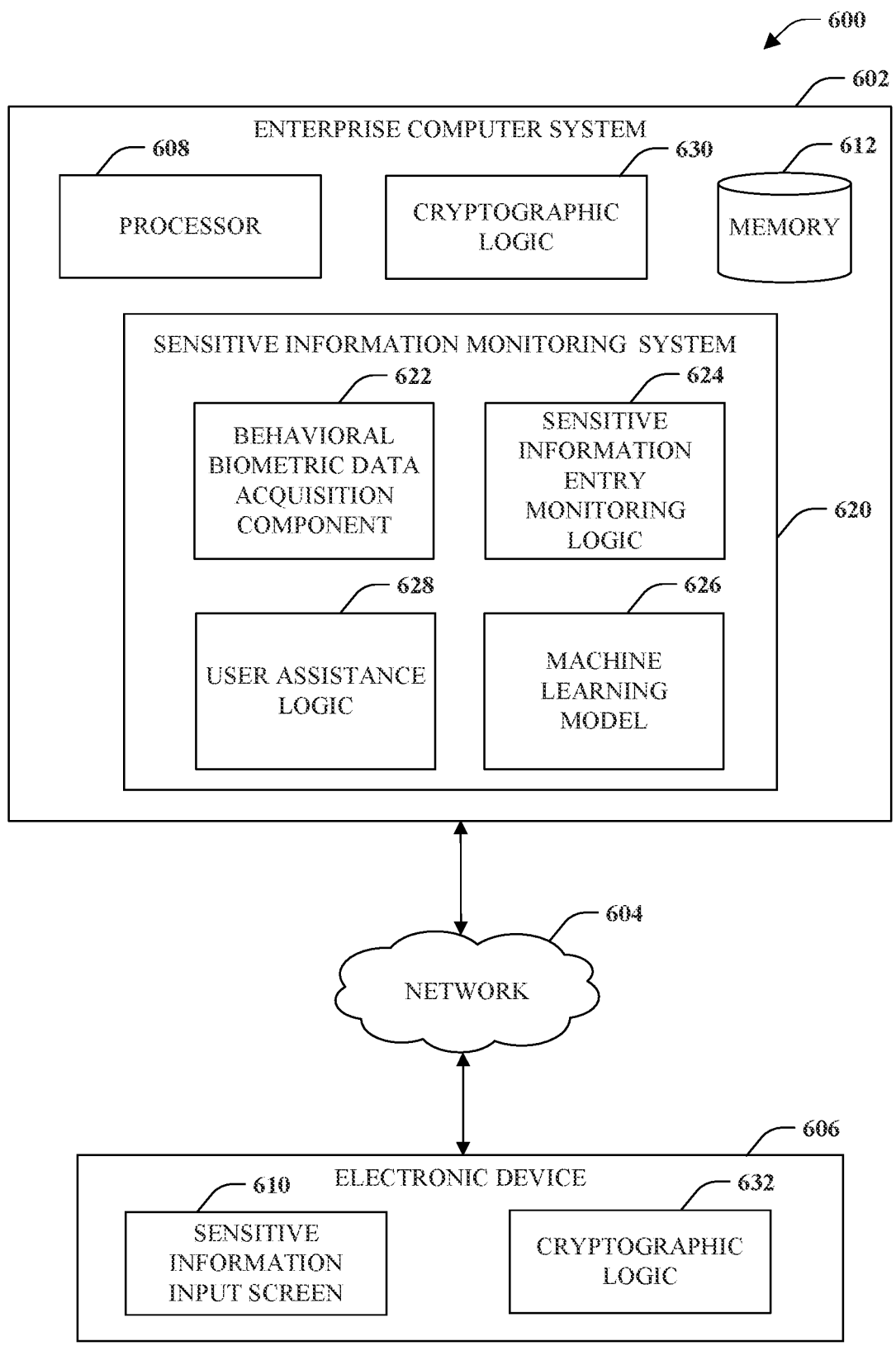
FIG. 6 is a block diagram of another sensitive information monitoring system.

FIG. 6 illustrates another example system 600 for correcting sensitive information that was improperly entered into an electronic form, website, an electronic device, and the like. The example system 600 includes an enterprise computer system 602, a network 604, and an electronic device 606. In some configurations, the sensitive information monitoring system 620 can, instead, be located in the electronic device 230.

The network 604 allows the enterprise computer system 602 and the electronic device 606 to communicate with each other. The network 604 can include portions of a local area network such as an Ethernet, portions of a wide area network such as the Internet, and can be a wired, optical, or wireless network. The network 604 can include other components and software understood by those of ordinary skill in the art.

The enterprise computer system 602 includes a processor 608, cryptographic logic 630, a memory 612, and a sensitive information monitoring system 620. The processor 608 can be implemented with solid-state devices such as transistors to create a processor that implements functions that one of ordinary skill in the art will appreciate are executed in silicon or other materials. Furthermore, the processor 608 can be implemented with a general-purpose processor, a digital signal processor (DSP), an application-specific integrated circuit (ASIC), a field-programmable gate array (FPGA), or another programmable logic device, discrete gates or transistor logic, discrete hardware components, or any combination thereof designed to perform the functions described herein.

The memory 612 can be any suitable device capable of storing and permitting data retrieval. In one aspect, the memory 612 can store sensitive information input to an electronic form, a website, software, or another way. Storage media includes volatile and non-volatile, removable and non-removable media implemented in any method or technology for information storage. Storage media includes, but is not limited to, storage devices such as memory devices (e.g., random access memory (RAM), read-only memory (ROM), magnetic storage devices (e.g., hard disk, floppy disk, cassettes, tape . . . ), optical disks and other suitable storage devices.

The electronic device 606 includes a sensitive information input screen 610 and cryptographic logic 632. The sensitive information input screen 610 can be any suitable software such as a website page, electronic form, or another display on the electronic device 606 for entering sensitive data. In some embodiments, the sensitive information input screen 610 can include an audio input device such as a microphone that can be spoken into or any other device that captures a user's thoughts and converts the thoughts into an electronic format.

The cryptographic logics 630 and 632 in the enterprise computer system 602 and the electronic device 606, respectively, allow the enterprise computer system 602 and the electronic device 606 to send encrypted data, including sensitive information and personally identifiable information (PII) between them. The cryptographic logics 630 and 632 are operable to produce encrypted sensitive information by way of an encryption algorithm or function. The electronic device's cryptographic logic 632 can receive, retrieve, or otherwise obtain the sensitive information from the sensitive information input screen 610. An encryption algorithm is subsequently executed on the combination to produce an encrypted value representative of the encoded sensitive data. Stated differently, the original plaintext of the combination of encoded sensitive information is encoded into an alternate cipher text form. For example, the Advanced Encryption Standards (AES), Data Encryption Standard (DES), or another suitable encryption standard or algorithm can be used. In one instance, symmetric-key encryption can be employed in which a single key both encrypts and decrypts data. The key can be saved locally or otherwise made accessible by the cryptographic logics 630 and 632. Of course, asymmetric-key encryption can also be employed in which different keys are used to encrypt and decrypt data. For example, a public key for a destination downstream function can be utilized to encrypt the data. In this way, the data can be decrypted downstream at a user device, as mentioned earlier, utilizing a corresponding private key of a function to decrypt the data. Alternatively, a downstream function could use its public key to encrypt known data.

The example system 600 can provide an additional level of security to the encoded data by digitally signing the encrypted sensitive information. Digital signatures employ asymmetric cryptography. In many instances, digital signatures provide a layer of validation and security to messages (i.e., sensitive information) sent through a non-secure channel. Properly implemented, a digital signature gives the receiver reason to believe the claimed sender sent the message.

Digital signature schemes, in a sense used here, are cryptographically based and must be implemented properly to be effective. Digital signatures can also provide non-repudiation, meaning that the signer cannot successfully claim they did not sign a message, while also claiming their private key remains secret. In one aspect, some non-repudiation schemes offer a timestamp for the digital signature, so even if the private key is exposed, the signature is valid.

Digitally signed messages can be anything representable as a bit-string such as encrypted sensitive information. The cryptographic logics 630 and 632 can use signature algorithms such as RSA (Rivest-Shamir-Adleman), which is a public-key cryptosystem that is widely used for secure data transmission. Alternatively, the Digital Signature Algorithm (DSA), a Federal Information Processing Standard for digital signatures, based on the mathematical concept of modular exponentiation and the discrete logarithm problem can be used. Other instances of the signature logic can use other suitable signature algorithms and functions.

The sensitive information monitoring system 620 includes a behavioral biometric data acquisition component 622, a sensitive information entry monitoring logic 624, a machine learning model 626, and a user assistance logic 628. The behavioral biometric data acquisition component 622, the sensitive information entry monitoring logic 624, the machine learning model 626, and the user assistance logic 628 can be implemented by a processor coupled to a memory that stores instructions that, when executed, cause the processor to perform the functionality of each component or logic. The behavioral biometric data acquisition component 622, the sensitive information entry monitoring logic 624, the machine learning model 626, and the user assistance logic 628 can be implemented in silicon or other hardware components so that the hardware, software, or both can implement their functionality as described herein.

The behavioral biometric data acquisition component 622 can receive, retrieve, or otherwise obtain or acquire data associated with a user's biometric behavior or actions. The data can include, for example, data detecting that a user is filling out a form field extremely quickly, and this can be behavioral biometric data indicating that there is a good chance that a user may enter sensitive information in an incorrect location. Alternatively, a user may be going through or filling out a form too slowly or hesitating and with lots of pauses (e.g., user timing information), which may indicate that the user is having trouble filling out an electronic form. The behavioral biometric data acquisition component 622, the machine learning model 626, and user assistance logic 628 can use this information to preemptively indicate to the user to correct for misplaced sensitive information. This information can be used by the machine learning model 626 to determine how likely a user or agent is to make a mistake and input sensitive information in an incorrect location within a document. The user assistance logic 628 can use information from the machine learning model 626 to assist the user in correctly entering sensitive information.

The user assistance logic 628 can use data and information from the behavioral biometric data acquisition component 622 and the machine learning model 626 to prompt the user to correct user behavior that might lead to the loss of sensitive information. For example, the user assistance logic 628 can use the information/behavior biometrics to display tooltips or some other form of prompting for remediation. Instead of placing a tooltip on every single field, the user assistance logic 628 can place a tooltip near where the inappropriate use of sensitive information is likely to happen. The user assistance logic 628 can detect if a customer is struggling through a form or is taking an abnormal amount of time to fill out a form that will contain sensitive information. When this is detected, the user assistance logic 628 can display an interactive chatbot or some other interactive device a user may chat with or ask questions with or otherwise have an interactive conversation with.

In another aspect, the sensitive information entry monitoring logic 624 and machine learning model 626 can determine whether sensitive information is being entered in an incorrect location or should not be entered at all. Upon this detection, the user assistance logic 628 can flash indications or lights on the electronic device 606 or cause the electronic device 606 to make audio sounds such as beeps. If the sensitive information entry monitoring logic 624 and machine learning model 626 detect and determine that the user has committed a serious error in the entry of sensitive information, the user assistance logic 628 can prevent the user of the electronic device 606 from going to the next page or require remediation before any more information is entered. For example, the user assistance logic 628 can highlight a field within the form itself where the sensitive information should be corrected. Alternatively, or in addition, the user assistance logic 628 can display a message above or below the field where the sensitive information should be corrected. In some instances, the user assistance logic 628 can gray out a "next" button and not proceed with the next field until the error is corrected.

In other instances, information that may not be biological behavior information but is information related to a person's action while using the electronic device 606 can still be detected by the behavioral biometric data acquisition component 622. For example, logic similar to the behavioral biometric data acquisition component 622 can detect biometric behavior data that indicates an abnormally long pause when the user is working on a form while entering sensitive information, and this can be useful information for the sensitive information entry monitoring logic 624 and the machine learning model 626 to know when determining if sensitive information may have been entered incorrectly. Of course, the sensitive information monitoring system 620 may not know what caused the long pause; however, long pauses are a known reason sensitive information may be incorrectly entered into a form, webpage, and the like. Thus, a long pause may be heavily weighted by the machine learning model 626.

The machine learning model 626 is operable to analyze the input of sensitive information, compute a risk score, and determine if the risk score crosses a threshold level (e.g., exceeds a threshold level). The risk score is a value that indicates the likelihood that an item on a form, website, or the like, was sensitive information that was entered incorrectly. In other words, the risk score is a value that captures the probability that sensitive information was entered incorrectly. For example, the machine learning model 626 can employ one or more rules to compute the risk score.

Various portions of the disclosed systems above and methods below can include or employ artificial intelligence or knowledge or rule-based components, sub-components, processes, means, methodologies, or mechanisms (e.g., support vector machines, neural networks, expert systems, Bayesian belief networks, fuzzy logic, data fusion engines, classifiers). Such components, among others, can automate certain mechanisms or processes performed thereby, making portions of the systems and methods more adaptive as well as efficient and intelligent. By way of example, and not limitation, the sensitive information monitoring system 620 of FIG. 6 can employ such mechanisms to automatically determine a risk score that is associated with the risk of sensitive information being placed in the wrong location or if the sensitive information should have been entered into a form or webpage at all.

The aforementioned systems, architectures, platforms, environments, or the like have been described with respect to interaction between several logics and components. It should be appreciated that such systems and components can include those logics or components or sub-components or sub-logics specified therein, some of the specified components or logics or sub-components or sub-logics, and/or additional components or logics. Sub-components could also be implemented as components or logics communicatively coupled to other components or logics rather than included within parent components. Further yet, one or more components or logics and/or sub-components or sub-logics can be combined into a single component or logic to provide aggregate functionality. Communication between systems, components or logics and/or sub-components or sub-logics can be accomplished following either a push and/or pull control model. The components or logics can also interact with one or more other components not specifically described herein for the sake of brevity but known by those of skill in the art.

Figure 7:
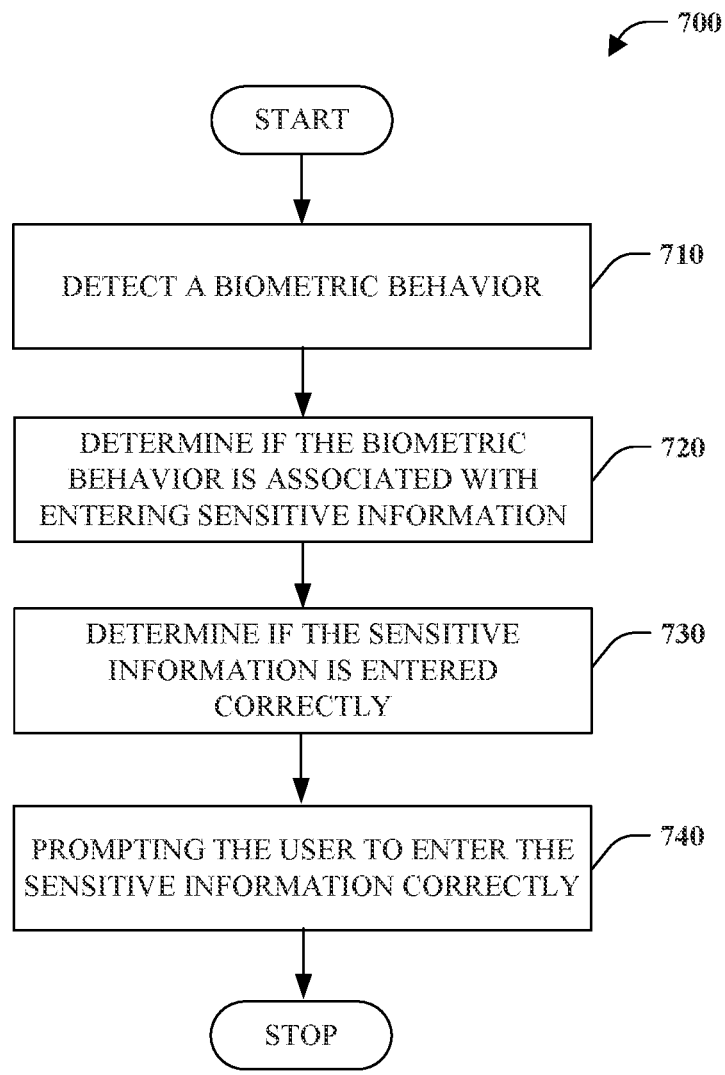
FIG. 7 is a flow chart diagram of a sensitive information monitoring method.
Figure 8:
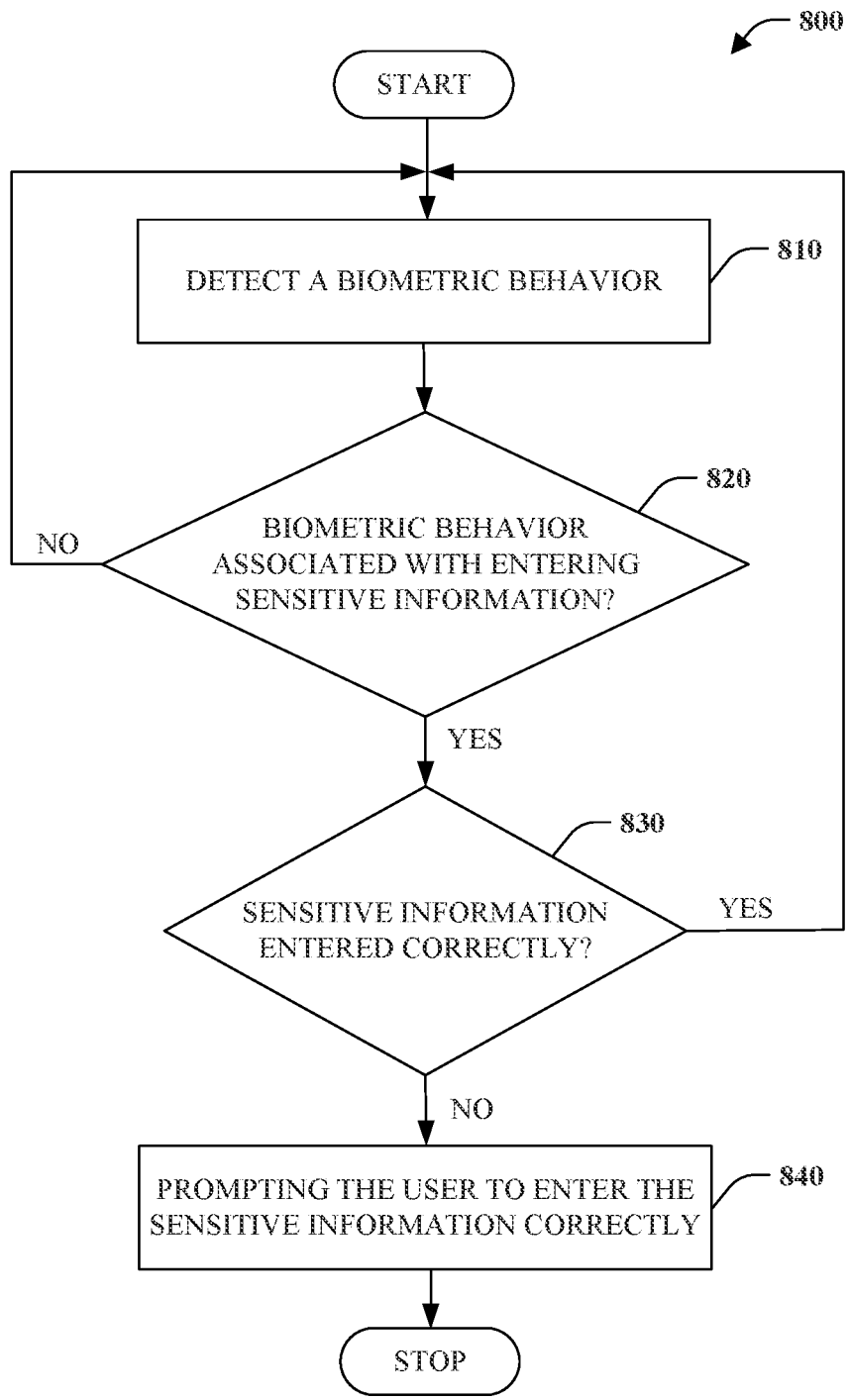
FIG. 8 is a flow chart diagram of another sensitive information monitoring method.
Figure 9:
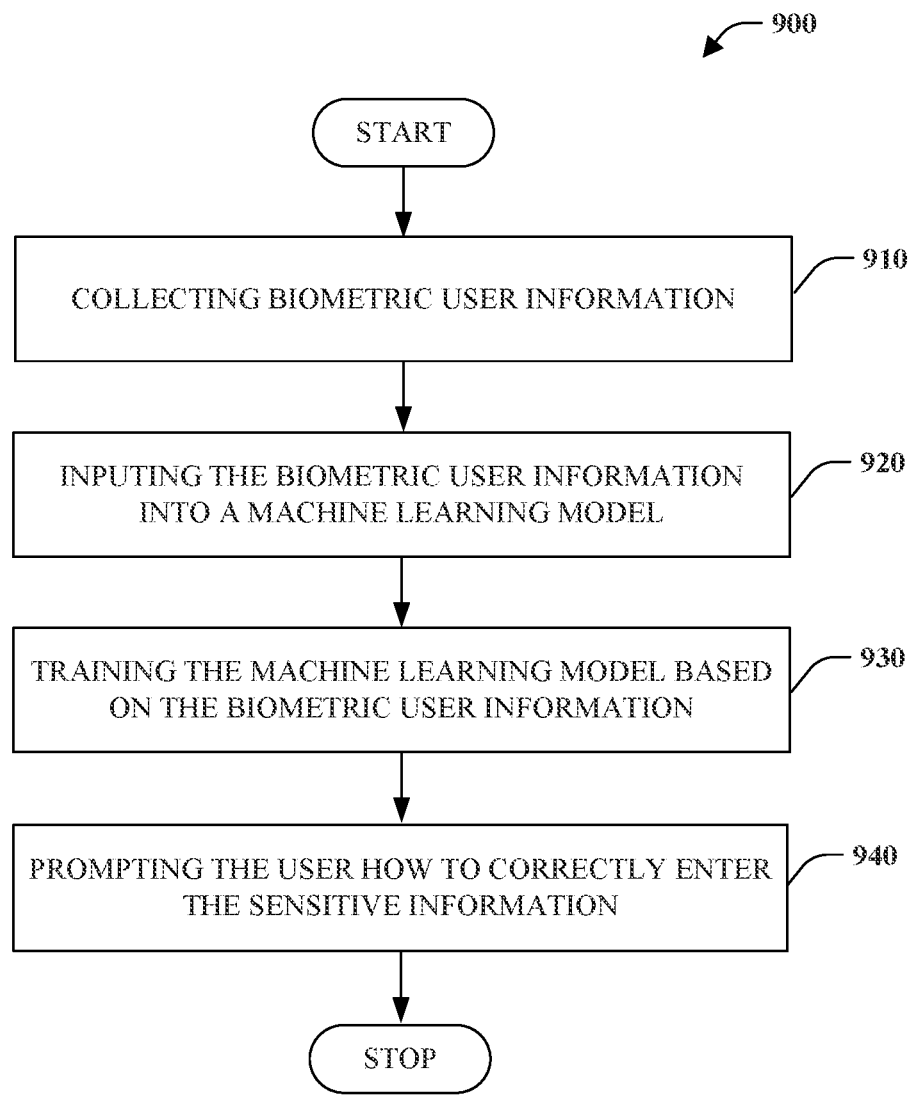
FIG. 9 is a flow chart diagram of another sensitive information monitoring method.

In view of the example systems described above, methods that can be implemented in accordance with the disclosed subject matter will be better appreciated with reference to flow chart diagrams of FIGS. 7-9. While for purposes of simplicity of explanation, the methods are shown and described as a series of blocks, it is to be understood and appreciated that the disclosed subject matter is not limited by the order of the blocks, as some blocks can occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Turning attention to FIG. 7, a method 700 for monitoring and preventing the incorrect entering of sensitive information is depicted in accordance with an aspect of this disclosure. The method 700 for monitoring and preventing the incorrect entering of sensitive information can be performed by the example sensitive information monitoring system 200, as discussed above with reference to FIG. 2.

At reference numeral 710, biometric behavior of a user is detected. Behavioral biometrics can be defined as to how a user behaviorally interacts with a computer system. For example, a user's interaction with a computer system can be tracked. The tracking of user interaction can include behavioral data of how fast a user fills out blocks within a standard form, a frequency the user creates typos or other mistakes, how often the user hesitates or pauses within a block of a form, and the like.

At reference numeral 720, a determination is made if the biometric behavior is associated with entering sensitive information. As discussed above, a machine learning model can play a role in making this determination. In other embodiments, other customer information, agent information, or digital interaction data can be used. Digital interaction data can include data on how the customer or agent interacts with electronic devices.

When the biometric behavior is associated with entering sensitive information, the method 700 determines, at reference numeral 730, if the sensitive information is entered incorrectly. In some instances, a machine learning model can determine if the sensitive information is entered incorrectly. Some configurations can determine if the sensitive information is entered incorrectly using the biometric behavior and natural language processing. The sensitive information can be determined to be entered incorrectly using the biometric behavior and a known syntax of the sensitive information.

If the sensitive information is entered incorrectly, the method 700 prompts, at reference numeral 740, for the user to enter the sensitive information correctly. The user can be prompted on how to enter the sensitive information correctly using a text window. Other aspects prompt the user with a chatbot on how to enter the sensitive information correctly. In some aspects, a determination is made if the sensitive information is entered incorrectly and if this determination is below an acceptable threshold level. When the entering of sensitive information is below the acceptable threshold level, the method 700 prompts the user on how to enter the sensitive information correctly.

Other configurations of the method 700 can include other useful features and functionality. For instance, when the sensitive information is entered incorrectly, the user can be prevented from moving to the next screen until the sensitive information is entered correctly. In some aspects, a light indicator can be generated when sensitive information is entered incorrectly. In other aspects, an audible or tactile indicator can be created when sensitive information is entered incorrectly.

FIG. 8 depicts a method 800 for monitoring and preventing the incorrect entering of sensitive information. The method 800 can be implemented and performed by the example sensitive information monitoring system 200 of FIG. 2 for monitoring and preventing the incorrect entering of sensitive information.

At reference numeral 810, biometric behavior of a user is detected. Behavioral biometrics can be defined as to how a user behaviorally interacts with a computer system. A determination is made, at reference numeral 820, if biometric behavior is associated with entering sensitive information. When the biometric behavior is not associated with entering sensitive information, flow returns to the start. When the biometric behavior is associated with entering sensitive information, the method 800 determines, at reference numeral 830, if the sensitive information is entered incorrectly. If the sensitive information is entered correctly, flow returns to the start. If the sensitive information is entered incorrectly, the method 800 prompts, at reference numeral 840, the user to enter the sensitive information to be entered correctly. The user can be prompted on how to enter the sensitive information correctly using a text window. Other aspects prompt the user with a chatbot on how to correctly enter the sensitive information or prompt the user in other ways, as discussed above, how to enter the sensitive information correctly.

FIG. 9 depicts an example method 900 of monitoring and preventing the incorrect entering of sensitive information. The example method 900 can be performed by the example system 600 of FIG. 6 for correcting sensitive information that was improperly entered into an electronic form, website, an electronic device, and the like, as discussed above.

At reference numeral 910, the biometric user information is collected from a computer system associated with a user. In some instances, the biometric user information is associated with the user interacting with an agent. The example method 900 can involve collecting biometric user information associated with entering sensitive information at a website or on a standard form such as an electronic form.

The biometric user information is input, at reference numeral 920, into a machine learning model. The example method 900 trains, at reference numeral 930, the machine learning model based on the biometric user information. The machine learning model is trained to predict when the user has a threshold chance of incorrectly inputting sensitive information into the computer system.

The user is prompted, at reference numeral 940, how to correctly enter the sensitive information when the threshold chance is exceeded. In some instances, the example method 900 adds a popup dialog window describing how to correctly enter sensitive information. The user can be prompted on how to enter sensitive information containing personally identifiable information.

As used herein, the terms "component" and "system," as well as various forms thereof (e.g., components, systems, sub-systems) are intended to refer to a computer-related entity, either hardware, a combination of hardware and software, software, or software in execution. For example, a component can be but is not limited to a process running on a processor, an object, an instance, an executable, a thread of execution, a program, and/or a computer. By way of illustration, both an application running on a computer and the computer can be a component. One or more components can reside within a process and/or thread of execution, and a component can be localized on one computer and/or distributed between two or more computers.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
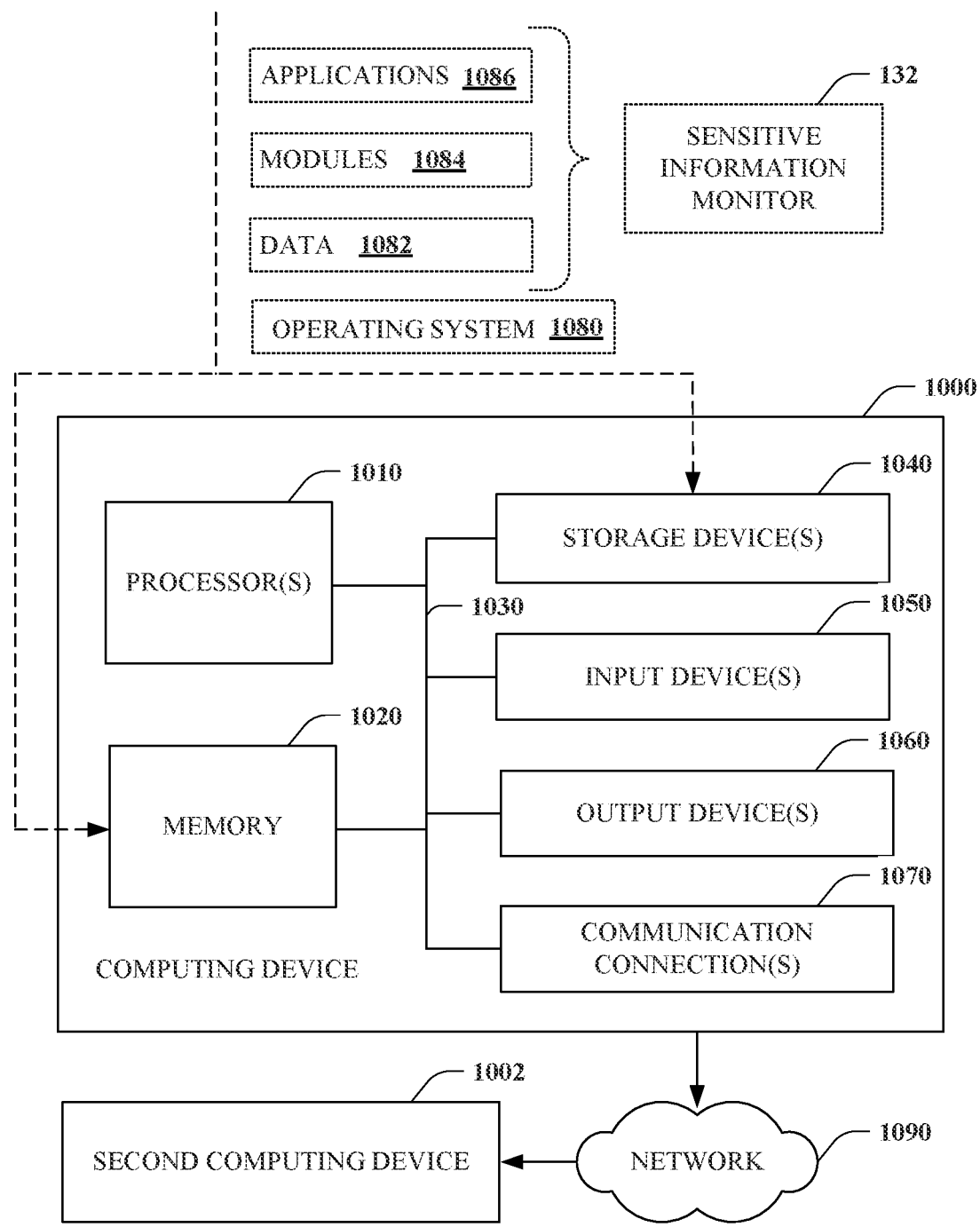
FIG. 10 is a block diagram illustrating a suitable operating environment for aspects of the subject disclosure.

To provide a context for the disclosed subject matter, FIG. 10, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules can be located in one or both of local and remote memory devices.

With reference to FIG. 10, illustrated is an example computing device 1000 (e.g., desktop, laptop, tablet, watch, server, hand-held, programmable consumer or industrial electronics, set-top box, game system, compute node). The computing device 1000 includes one or more processor(s) 1010, memory 1020, system bus 1030, storage device(s) 1040, input device(s) 1050, output device(s) 1060, and communications connection(s) 1070. The system bus 1030 communicatively couples at least the above system constituents. However, the computing device 1000, in its simplest form, can include one or more processors 1010 coupled to memory 1020, wherein the one or more processors 1010 execute various computer-executable actions, instructions, and or components stored in the memory 1020.

The processor(s) 1010 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. The processor(s) 1010 can also be implemented as a combination of computing devices, for example, a combination of a DSP and a microprocessor, a plurality of microprocessors, multi-core processors, one or more microprocessors in conjunction with a DSP core, or any other such configuration. In one configuration, the processor(s) 1010 can be a graphics processor unit (GPU) that performs calculations concerning digital image processing and computer graphics.

The computing device 1000 can include or otherwise interact with a variety of computer-readable media to facilitate control of the computing device to implement one or more aspects of the disclosed subject matter. The computer-readable media can be any available media accessible to the computing device 1000 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storing information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 1000. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 1020 and storage device(s) 1040 are examples of computer-readable storage media. Depending on the configuration and type of computing device, the memory 1020 can be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 1000, such as during start-up, can be stored in non-volatile memory, while volatile memory can act as external cache memory to facilitate processing by the processor(s) 1010, among other things.

The storage device(s) 1040 include removable/non-removable, volatile/non-volatile storage media for storing vast amounts of data relative to the memory 1020. For example, storage device(s) 1040 include, but are not limited to, one or more devices such as a magnetic or optical disk drive, floppy disk drive, flash memory, solid-state drive, or memory stick.

Memory 1020 and storage device(s) 1040 can include, or have stored therein, operating system 1080, one or more applications 1086, one or more program modules 1084, and data 1082. The operating system 1080 acts to control and allocate resources of the computing device 1000. Applications 1086 include one or both of system and application software and can exploit management of resources by the operating system 1080 through program modules 1084 and data 1082 stored in the memory 1020 and/or storage device(s) 1040 to perform one or more actions. Accordingly, applications 1086 can turn a general-purpose computer 1000 into a specialized machine in accordance with the logic provided thereby.

All or portions of the disclosed subject matter can be implemented using standard programming and/or engineering techniques to produce software, firmware, hardware, or any combination thereof to control the computing device 1000 to realize the disclosed functionality. By way of example and not limitation, all or portions of the sensitive information monitor 132 can be, or form part of, the application 1086, and include one or more modules 1084 and data 1082 stored in memory and/or storage device(s) 1040 whose functionality can be realized when executed by one or more processor(s) 1010.

In accordance with one particular configuration, the processor(s) 1010 can correspond to a system on a chip (SOC) or like architecture including, or in other words integrating, both hardware and software on a single integrated circuit substrate. Here, the processor(s) 1010 can include one or more processors as well as memory at least similar to the processor(s) 1010 and memory 1020, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the sensitive information monitor 132 and/or functionality associated therewith can be embedded within hardware in a SOC architecture.

The input device(s) 1050 and output device(s) 1060 can be communicatively coupled to the computing device 1000. By way of example, the input device(s) 1050 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 1060, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1050 and output device(s) 1060 can be connected to the computing device 1000 by way of wired connection (e.g., bus), wireless connection (e.g., Wi-Fi, Bluetooth), or a combination thereof.

The computing device 1000 can also include communication connection(s) 1070 to enable communication with at least a second computing device 1002 utilizing a network 1090. The communication connection(s) 1070 can include wired or wireless communication mechanisms to support network communication. The network 1090 can correspond to a local area network (LAN) or a wide area network (WAN) such as the Internet. The second computing device 1002 can be another processor-based device with which the computing device 1000 can interact. In one instance, the computing device 1000 can execute a sensitive information monitor 132 for a first function, and the second computing device 1002 can execute a sensitive information monitor 132 for a second function in a distributed processing environment. Further, the second computing device can provide a network-accessible service that stores source code, and encryption keys, among other things that can be employed by the sensitive information monitor 132 executing on the computing device 1000.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of protecting sensitive information, comprising:
   executing, on a processor, instructions that cause the processor to perform operations associated with protecting sensitive information, the operations comprising:
   capturing a current biometric behavior of a user that is specific to a user's interaction with an electronic form;
   comparing the current biometric behavior to a benchmark biometric behavior of the user associated with past interactions with the electronic form;
   using a machine learning model, determining a risk score based on the comparing;
   determining a likelihood that sensitive information was mistakenly entered into the electronic form based on the risk score exceeding a predetermined threshold;
   determining that the sensitive information was mistakenly entered into the electronic form based on the determined likelihood; and
   in response to determining that the sensitive information was mistakenly entered, prompting the user with a highlighted correct location and instruction to redact the mistakenly entered sensitive information.

2. The method of claim 1, the operations further comprising determining that sensitive information was mistakenly entered into the electronic form using natural language processing and the risk score.

3. The method of claim 1, the operations further comprising prompting the user with a chatbot that provides instructions on how to enter the sensitive information correctly.

4. The method of claim 1, the operations further comprising prompting the user with a text window that specifies instructions on how to enter the sensitive information correctly.

5. The method of claim 1, the operations further comprising preventing the user from moving to a next form field until the sensitive information is entered correctly.

6. The method of claim 1, the operations further comprising providing a light indicator responsive to the risk score.

7. The method of claim 1, wherein the current biometric behavior represents a period of time the user takes to complete sections of the electronic form.

8. The method of claim 1, the operations further comprising comparing the sensitive information to a known syntax of the sensitive information.

9. The method of claim 1, further comprising creating an audible indicator responsive to the risk score.

10. A sensitive information protection system, comprising:
a processor coupled to a memory that includes instructions that, when executed by the processor, cause the processor to:
capture a current biometric behavior of a user that is specific to a user's interaction with an electronic form, wherein the current biometric behavior includes a current mood, and wherein the electronic form is an electronic document including two or more field locations for entering data;
compare the current biometric behavior to a benchmark biometric behavior of the user associated with past interactions with the electronic form to create a comparison result;
using a machine learning model, determine a risk score in response to the comparison;
determine that sensitive information was mistakenly entered into the electronic form in response to the risk score exceeding a predetermined threshold; and
prompt the user with a message beside a correct field location, the correct field location including a correct location to enter the sensitive information, the message including instructions to redact the mistakenly entered sensitive information and to enter the information at the correct field location.

11. The system of claim 10, wherein the instructions further cause the processor to train the machine learning model using the current biometric behavior and the benchmark biometric behavior.

12. The system of claim 10, wherein the instructions further cause the processor to invoke the machine learning model to:
trigger a convolutional neural network (CNN) to establish the risk score; and
train the CNN using the benchmark biometric behavior.

13. The system of claim 10, wherein the instructions further cause the processor to display information on an electronic device explaining how to enter the sensitive information.

14. The system of claim 10, wherein the instructions further cause the processor to display a chatbot on an electronic device to permit chat with the user to instruct the user how to enter the sensitive information.

15. The system of claim 10, wherein the instructions further cause the processor to create an audible signal that describes to the user how to enter the sensitive information.

16. The system of claim 10, wherein the instructions further cause the processor to prompt the user on how to enter the sensitive information with a text window.

17. A computer-implemented method, comprising:
capturing an action behavior of a user that is specific to a user's interaction with an electronic form document including two or more field locations for entering data;
comparing the action behavior to a benchmark behavior of the user associated with past interactions with the electronic form;
using a machine learning model, determining a risk score based on the comparing;
determining that sensitive information was mistakenly entered into the electronic form based on the risk score exceeding a predetermined threshold; and
in response to the risk score exceeding a predetermined threshold, preventing the user from moving on by inactivating a button to proceed until the mistakenly entered sensitive information is redacted and entered correctly in a correct location prompted to the user.

18. The method of claim 17, further comprising collecting user action information that includes timing information related to how rapidly the user enters sensitive information.

19. The method of claim 17, further comprising collecting user action information associated with entering sensitive information at a website.

* * * * *